UNITED STATES PATENT OFFICE.

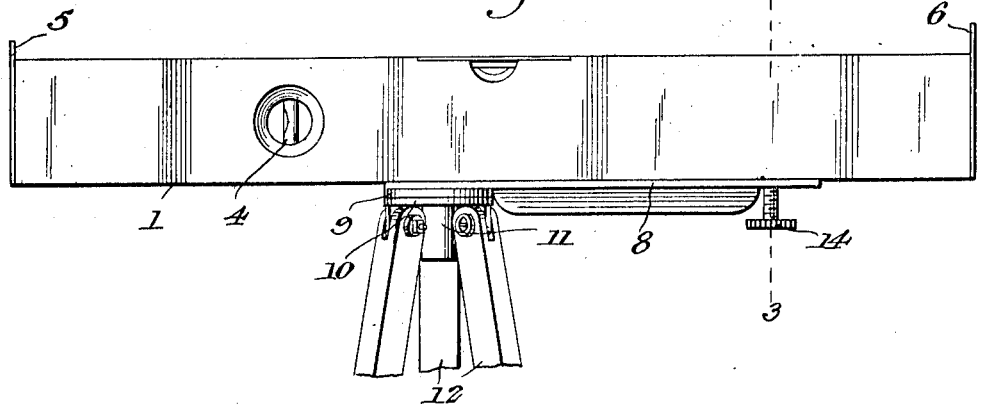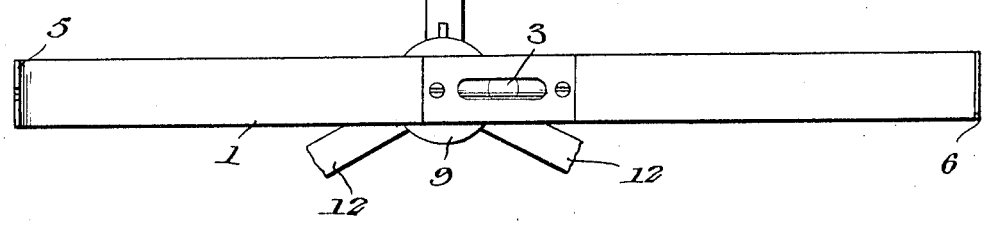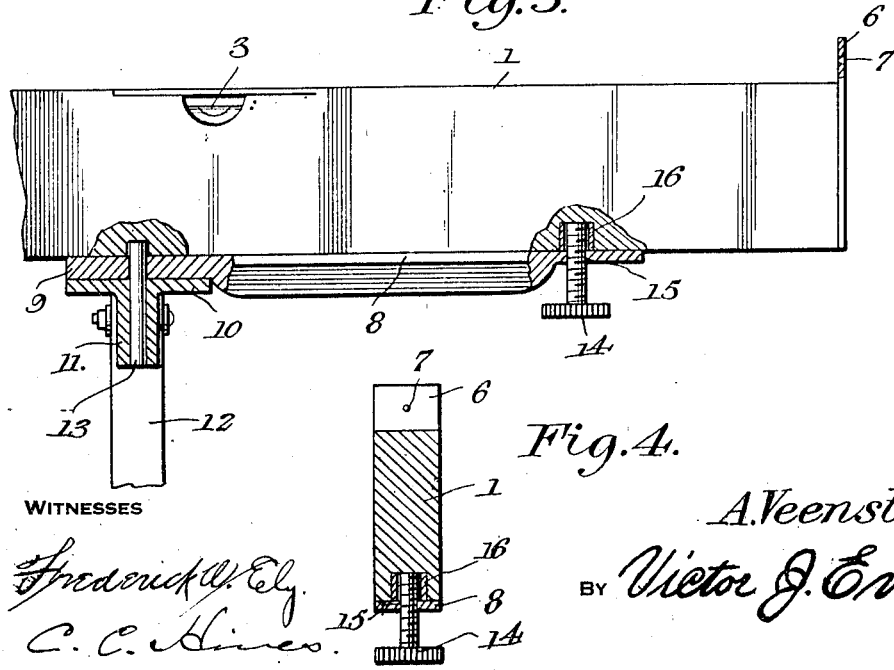

ABRAM VEENSTRA, OF PATERSON, NEW JERSEY.

LEVEL.

1,270,074.  Specification of Letters Patent.  Patented June 18, 1918.

Application filed November 15, 1916. Serial No. 131,495.

*To all whom it may concern:*

Be it known that I, ABRAM VEENSTRA, a citizen of the United States, residing at Paterson, in the county of Passaic and State of New Jersey, have invented new and useful Improvements in Levels, of which the following is a specification.

This invention relates to levels, the object of the invention being to provide a level which may be employed as a sighting and indicating device, whereby the operator may determine whether or not an object located at a distance from the instrument is on an exact level with the instrument, and parallel or substantially so with the surface upon which the instrument rests.

A further object of the invention is to provide a device of this character which is simple of construction, may be conveniently turned to any angular position desired with relation to its support, and which may be employed for some of the purposes for which a level and transit is customarily used.

The invention consists of the features of construction, combination and arrangement of parts hereinafter fully described and claimed, reference being had to the accompanying drawing in which:—

Figure 1 is a side elevation of a sight level constructed in accordance with my invention.

Fig. 2 is a top plan view of the same.

Fig. 3 is a vertical longitudinal section.

Fig. 4 is a vertical transverse section on line 3—3 of Fig. 1.

In carrying my invention into practice, I employ a level 1, which, with certain exceptions, may be in the form of an ordinary carpenter's level, comprising an oblong rectangular block or body carrying the usual vertical and horizontal spirit level tubes 3 and 4, the level 4 being particularly adapted for use in sight leveling for determining the level of an object at a distance, as hereinafter fully described. In accordance with my invention, the front end of the level bar is provided with a front sight member 5, which may have an upwardly projecting notched end, and the rear end of the bar is provided with an upwardly projecting rear sight member 6, having a tapered sight opening 7 formed therein, through which sight members the operator may bring the desired object at a distance into view.

The level bar or body 1 has secured to its underside a bracket arm 8 extending from a point about centrally thereof a distance toward its rear end. The inner end of this bracket arm 8 terminates in a turn-table plate 9 which rests upon a coöperating turn-table 10, forming a part of the head 11 of a base support, said support being in the form of a tripod comprising the head 11 and a series of depending, pivoted supported legs 12. A pivot pin 13 is carried by the tripod head and extends upwardly through the turn-table plates into a socket formed in the level body, so that the level bar or body may be turned or rotated in a horizontal plane to dispose it at any desired angle in its range of movement for convenience in leveling operations. The pivotal connection is sufficiently loose in character to permit the bar 1 to tilt to a determined extent in a vertical plane, and for the purpose of so tilting the bar a thumb screw 14 is provided and fitted in a threaded opening 15 in the outer end of the arm 8, said screw engaging a threaded bushing 16 in the rear end of the bar, whereby said bar may be adjusted upwardly and downwardly at different angles to the horizontal or to dispose it in an exactly level or horizontal position.

In the use of the device, the bar may be turned upon its pivot to set it to point in the desired direction, and then, the base support having been arranged to rest upon a desired surface, the operator may train the bar like a telescope upon a desired distant object and, by using the sight objects, may bring the distant object into a direct line with both sight objects, which are disposed in a plane parallel with the bar. By then consulting the horizontal level tube the operator may determine whether or not the distant object is horizontal or level, and also whether or not such object is out of level or level with the surface upon which the base support rests. By the use of the vertical level tube, if mounted in a rotatable device coöperating with a graduated member, the degree to which the level bar is tilted to bring the distant object in sight may be determined as to angularity with a degree of accuracy, thus enabling the extent to which the distant object is out of level to be calculated with ease and facility.

I claim:—

A sight level comprising a support, a plate member carried thereby, a pin projecting upwardly from the plate, a body portion, a level mounted therein, a plate member below the body, supporting the latter and having an aperture through which the pin passes, the body being provided with a recess permitting rotatable and tilting movement, an arm carried by the plate member last named, and a thumb screw passing through the arm and engaging the body for varying the angular position thereof.

ABRAM VEENSTRA.

Signed in presence of—
 WILLIAM SNYDER.